(12) United States Patent
Wong et al.

(10) Patent No.: US 8,553,034 B2
(45) Date of Patent: *Oct. 8, 2013

(54) DYNAMIC VISUALIZATION OF DATA STREAMS

(75) Inventors: Pak Chung Wong, Richland, WA (US); Harlan P. Foote, Richland, WA (US); Daniel R. Adams, Kennewick, WA (US); Wendy E. Cowley, Richland, WA (US); James J. Thomas, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 162 days.

This patent is subject to a terminal disclaimer.

(21) Appl. No.: 12/436,906

(22) Filed: May 7, 2009

(65) Prior Publication Data

US 2009/0273602 A1     Nov. 5, 2009

Related U.S. Application Data

(63) Continuation of application No. 10/688,063, filed on Oct. 17, 2003, now Pat. No. 7,557,805.

(60) Provisional application No. 60/459,841, filed on Apr. 1, 2003.

(51) Int. Cl.
*G06T 11/20* (2006.01)

(52) U.S. Cl.
USPC .......................................................... 345/440

(58) Field of Classification Search
USPC .......................................................... 345/440
See application file for complete search history.

(56) References Cited

U.S. PATENT DOCUMENTS

| | | | | |
|---|---|---|---|---|
| 5,175,710 | A  * | 12/1992 | Hutson | 367/135 |
| 6,505,207 | B1 * | 1/2003 | Aggarwal et al. | 1/1 |
| 6,760,724 | B1 * | 7/2004 | Chakrabarti et al. | 1/1 |
| 6,873,325 | B1 * | 3/2005 | Kontkanen et al. | 345/440 |
| 7,221,728 | B2 * | 5/2007 | Edic et al. | 378/8 |
| 2003/0018594 | A1 * | 1/2003 | Aggarwal | 706/12 |
| 2003/0152069 | A1 * | 8/2003 | Schkilnik et al. | 370/369 |

OTHER PUBLICATIONS

Deerwester et al., "Indexing by latent Semantic Analysis", University of Western Ontario, 1990.*

* cited by examiner

*Primary Examiner* — Jeffrey Chow
(74) *Attorney, Agent, or Firm* — Woodard, Emhardt, Moriarty, McNett & Henry LLP

(57) ABSTRACT

One embodiment of the present invention includes a data communication subsystem to receive a data stream, and a data processing subsystem responsive to the data communication subsystem to generate a visualization output based on a group of data vectors corresponding to a first portion of the data stream. The processing subsystem is further responsive to a change in rate of receipt of the data to modify the visualization output with one or more other data vectors corresponding to a second portion of the data stream as a function of eigenspace defined with the group of data vectors. The system further includes a display device responsive to the visualization output to provide a corresponding visualization.

15 Claims, 11 Drawing Sheets

DYNAMIC VISUALIZATION OF DATA STREAMS

CROSS-REFERENCE TO RELATED APPLICATION(S)

The present application is a continuation of U.S. Ser. No. 10/688,063 filed Oct. 17, 2003, now U.S. Pat. No. 7,557,805 which claims the benefit of U.S. Provisional App. No. 60/459,841 filed Apr. 1, 2003, which are hereby incorporated by reference.

BACKGROUND

The present invention relates to data processing and more particularly, but not exclusively, relates to the visualization of data from a data stream.

Recent technological advancements have led to the generation of vast amounts of electronic data. Unfortunately, the ability to quickly identify patterns or relationships, and/or the ability to readily perceive underlying concepts from such data remain highly limited. Moreover, the ability to meaningfully visualize large amounts of data presents an even greater challenge.

Data of interest can be static in nature, such as that stored in a given corpus; or dynamic in nature, such as a data stream. As a more recent area of interest, data stream processing poses several unique challenges. The time-varying information of a data stream typically has the characteristics of arriving continuously, unpredictably, and unboundedly without any persistent patterns. Data stream examples include newswires, internet click streams, network resource measurements, phone call records, and remote sensing imagery, just to name a few. The increasing desire to more immediately analyze data streams in various time-sensitive applications (such as Homeland Security) has created a particular interest in better visualization tools for data streams.

Thus, there is an ongoing need for further contributions in this area of technology.

SUMMARY

One embodiment of the present invention is a unique data processing technique. Other embodiments include unique apparatus, systems, devices, and methods for visualizing data stream information.

A further embodiment of the present invention includes a technique to analyze a data stream, including: processing a stream of data vectors; generating a visualization from a first group of these vectors; determining a set of values corresponding to one or more eigenvectors for a matrix defined with this first group of data vectors; and projecting each member of a second group of data vectors onto the visualization as a function of the set of values.

Yet a further embodiment includes: receiving a first portion of a data stream at or below a defined rate; generating a first visualization from a group of data vectors corresponding to the first portion; receiving a second portion of the data stream above the defined rate; and generating a second visualization by updating the first visualization with one or more additional data vectors as a function of an eigenspace defined within the group of data vectors. The one or more additional vectors correspond to the second portion of the data stream. In one form, the generation of the second visualization includes determining a dot product between each of the one or more additional data vectors and one or more eigenvectors corresponding to the eigenspace.

Still another embodiment of the present invention comprises: receiving a data stream, processing a group of data vectors corresponding to the data stream, generating a reduced data set which includes reducing dimension of the data vectors as a function of wavelet decomposition, and providing a representation with a reduced data set corresponding to a visualization of a portion of the data stream. In one form, a wavelet decomposition routine is performed with Haar wavelets. Alternatively or additionally, a multidimensional scaling routine is performed to provide a visualization.

Another embodiment of the present invention includes: receiving a data stream, processing a stream of data vectors corresponding to the data streams, visualizing at least a portion of the data stream by executing a multidimensional scaling routine with at least a corresponding portion of the data vectors, and performing a routine with a group of data vectors to provide a data set with a reduced number of data elements relative to the number of elements in the group. This routine can include dimension reduction and/or sampling of the group of data vectors.

In further embodiments, methods, systems, apparatus, and devices are provided to perform the various above embodiments. In one example, a device carrying logic executable by a processing subsystem receives a data stream to perform any of the various embodiments indicated above. In another example, a system is provided with a data communication subsystem, a processing subsystem, and an operator input/output subsystem arranged to perform any of the above embodiments.

Accordingly, one object of the present invention is to provide a unique data processing technique.

Another object is to provide a unique apparatus, system, device, or method for the visualization of data stream information.

Further objects, embodiments, forms, features, aspects, benefits, and advantages of the present invention will become apparent from the drawings and detailed description contained herein.

DETAILED DESCRIPTION OF SELECTED EMBODIMENTS

Figure 1:
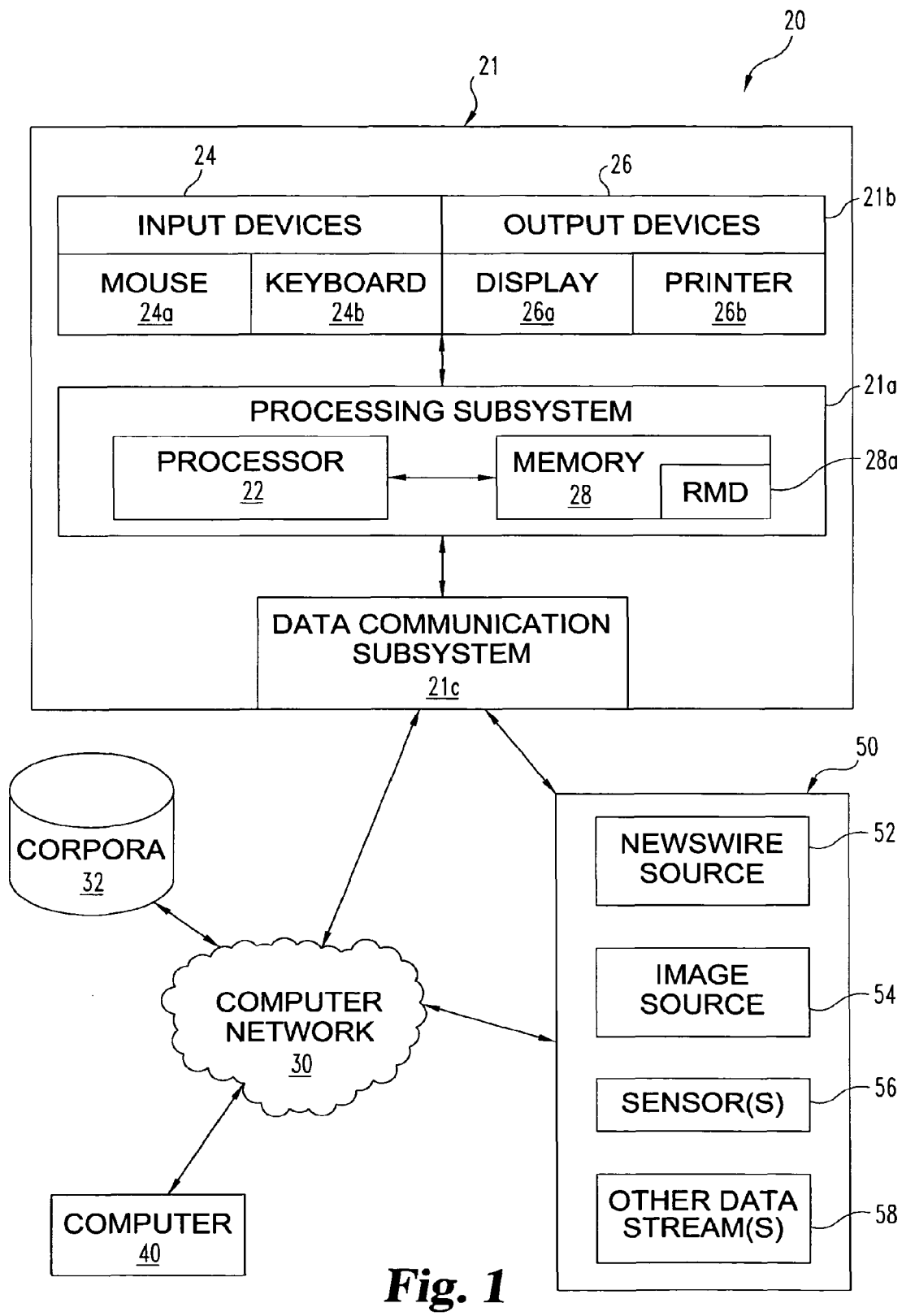
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Among the embodiments of the present invention are various techniques to dynamically visualize transient data streams. In at least some of these embodiments there is an adaptive/selective application of Multidimensional Scaling (MDS). While the time-sensitive nature of these data streams often results in the desire to be immediately responsive to changes in many applications, the unpredictable and unbounded characteristics of this information can potentially overwhelm many MDS algorithms that require a full re-computation for every update. In one form, an adaptive visualization technique based on data stratification ingests stream information adaptively when influx rate exceeds processing rate. In another form that may be alternatively or additionally employed, an incremental visualization technique based on data fusion projects new data stream information directly onto an orthogonal visualization subspace spanned by selected singular vectors of the previously processed neighboring data. In this approach, a sliding pair of data windows can be utilized in which the dominant eigenvectors obtained from the larger of the windows define this subspace and are used to map the information from the smaller of the windows onto a visualization without re-processing the entire dataset.

In one implementation of the present invention, the visualization output of an MDS analysis is a low-dimensional scatter plot in which pairwise distances between any points reflect the similarities of the items represented by the points. To assess accuracy of the progressive/adaptive visualization techniques used to represent a changing data stream, error-tracking can be utilized based on visual and/or computational comparative analysis of resulting scatter plots.

FIG. 1 diagrammatically depicts computer system 20. System 20 includes computer equipment 21 with processing subsystem 21a, operator input/output (I/O) subsystem 21b, and data communication subsystem 21c. Processing subsystem 21a includes processor 22. Processor 22 can be of any type, and is configured to operate in accordance with programming instructions and/or another form of operating logic. In one form, processor 22 is integrated circuit based, including one or more digital, solid-state central processing units each of a microprocessor variety. Processing subsystem also includes memory 28 operatively coupled to processor 22. Memory 28 can be of one or more types, such as solid-state electronic memory, magnetic memory, optical memory, or a combination of these. As illustrated in FIG. 1, memory 28 includes a removable/portable memory (RMD) device 28a that can be an optical disk (such as a CD ROM or DVD); a magnetically encoded hard disk, floppy disk, tape, or cartridge; and/or a different form as would occur to those skilled in the art. In one embodiment, at least a portion of memory 28 is operable to store programming instructions for selective execution by processor 22. Alternatively or additionally, memory 28 can be arranged to store data other than programming instructions for processor 22. In still other embodiments, memory 28 and/or portable memory device 28a may not be present.

Operator I/O subsystem 21b includes operator input devices 24 and operator output devices 26 operatively coupled to processing subsystem 21a. Input devices 24 include a conventional mouse 24a and keyboard 24b, and alternatively or additionally can include a trackball, light pen, voice recognition subsystem, and/or different input device type as would occur to those skilled in the art. Output devices 26 include a conventional graphic display 26a, such as a color or noncolor plasma, Cathode Ray Tube (CRT), or Liquid Crystal Display (LCD) type, and color or noncolor printer 26b. Alternatively or additionally output devices 26 can include an aural output system and/or different output device type as would occur to those skilled in the art. Further, in other embodiments, more or fewer operator input devices 24 or operator output devices 26 may be utilized.

System 20 also includes computer network 30 coupled to computer 21 via data communication subsystem 21c. Network 30 can be a Local Area Network (LAN); Municipal Area Network (MAN); Wide Area Network (WAN), such as the Internet; another type as would occur to those skilled in the art; or a combination of these. One or more corpora 32 are coupled to computer equipment 21 via network 30. Computer equipment 21 is operable to selectively process data selected from one or more corpora 32. Network 30 also couples computer 40 to computer equipment 21; where computer 40 is remotely located relative to computer equipment 21. Computer 40 can include a processor, input devices, output devices, and/or memory as described in connection with computer equipment 21; however, these features of computer 40 are not shown to preserve clarity.

Computer 40 and computer equipment 21 can be arranged as client and server, respectively, in relation to some or all of the data processing of the present invention. For this arrangement, it should be understood that many other remote computers 40 could be included as clients of computer equipment 21, but are not shown to preserve clarity. In another embodiment, computer equipment 21 and computer 40 can both be participating members of a distributed processing arrangement with one or more processors located at a different site relative to the others. The distributed processors of such an arrangement can be used collectively to execute processes, routines, operations, stages, conditionals, and/or procedures according to the present invention. In still other embodiments, remote computer 40 may be absent.

In addition to computer network 30, data communication subsystem 21c is also operatively coupled to data stream sources 50. Sources 50 are also indirectly connected to subsystem 21c via computer network 30. Sources 50 include newswire source 52 which provides a data stream if textual documents regarding pertinent news stories, and image source 54 which provides streaming image data. Sources 50 also include one or more sensors 56 providing one or more data streams. Still other data stream sources are designated by reference numeral 58, which can include audio data, video data, phone call records, internet click streams, and/or travel records, just to name a few examples. It should be appreciated that data communicated to computer equipment 21 from network 30 can be presented as a data stream whether originating from the one or more corpora 32, computer 40, sources 50, and/or elsewhere.

Operating logic for processing subsystem 21a is arranged to facilitate performance of various routines, procedures, stages, operations, and/or conditionals described hereinafter in connection with FIGS. 2-11. This operating logic can be of a dedicated, hardwired variety and/or in the form of programming instructions as is appropriate for the particular processor arrangement. Such logic can be at least partially encoded on device 28a for storage and/or transport to another computer. Alternatively or additionally, the logic of computer 21 can be in the form of one or more signals carried by a transmission medium, such as one or more components of network 30.

Figure 2:
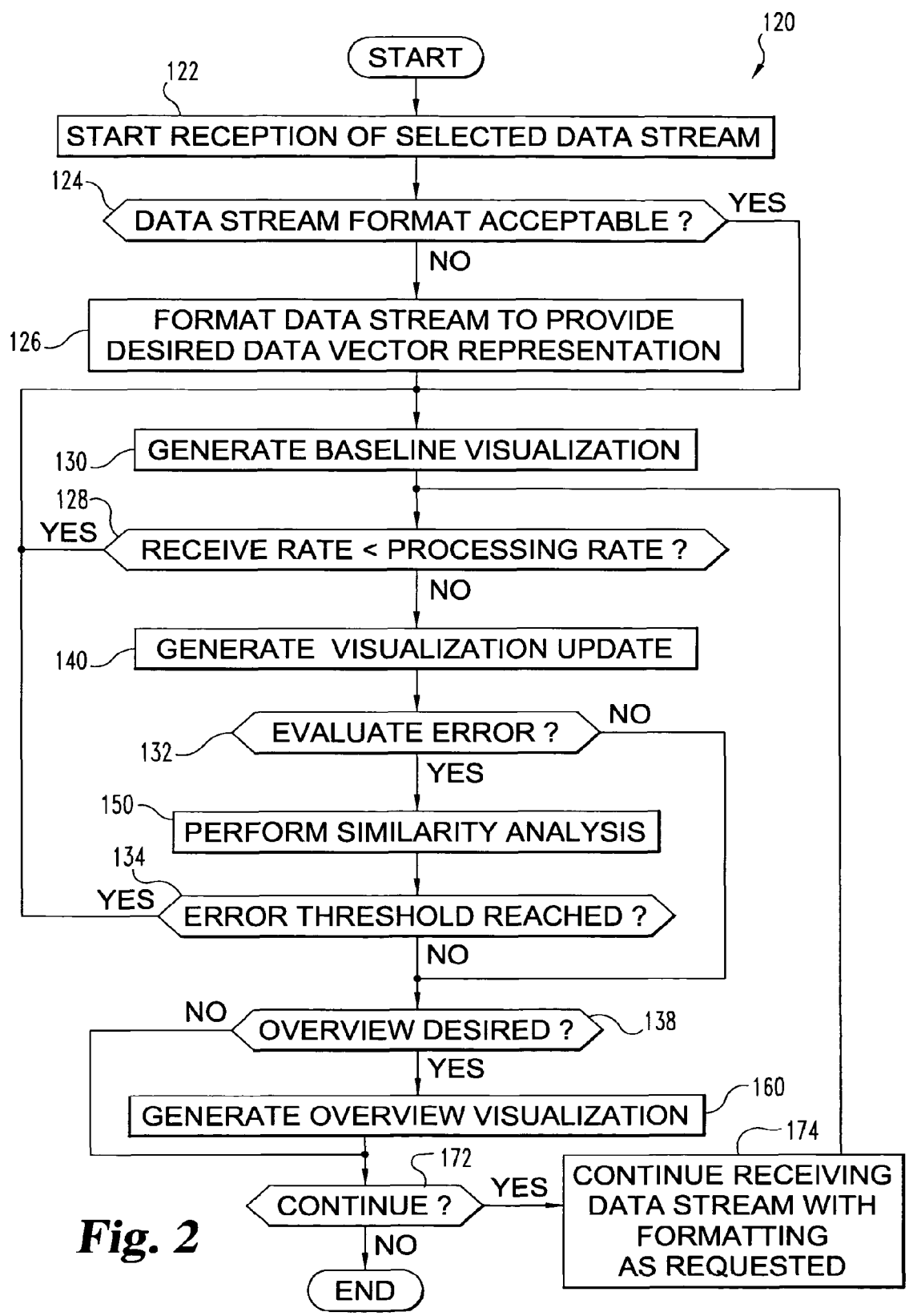
FIG. 2 is a flowchart illustrating details of a process that can be executed with the system of FIG. 1.

FIG. 2 illustrates data stream visualization process 120 in flowchart form. Process 120 can be executed with system 20 in accordance with operating logic of subsystem 21a. Process 120 begins with the receipt of a data stream DS in operation 122 by processing subsystem 21a via data communication subsystem 21c. Data stream DS can originate from one or more of network 30, corpora 32, computer 40, and/or sources 50. It should be understood that data stream DS is of a type that is generally continuously received by system 20 throughout the execution of various aspects of process 120, and may vary as to the rate of data receipt and in other respects as will be more fully described with reference to certain nonlimiting examples hereinafter.

From operation 122, process 120 continues with conditional 124. Conditional 124 tests whether the format of data stream DS is acceptable for visualization processing directly or whether any reformatting/preprocessing is required. In subsequent operations of process 120, information from data stream DS is input as one or more corresponding data vectors. Data stream DS may be received in an appropriate data vector format, in which case the test of conditional 124 is affirmative (true), and process 120 continues with visualization operation 130 to be more fully described hereinafter. In the case where the format of data stream DS is not acceptable, such that the test of conditional 124 is negative (false), then process 120 continues with operation 126. In operation 126, data stream DS is formatted to provide the desired data vector arrangement. The specific nature of operation 126 varies with the type of information provided by data stream DS and its organization. In one example, pixelated image data may be received in a vectorized form requiring little (if any) reformatting in operation 126. Such a data stream DS could be provided from image source 54.

In another example, a textual document form of data stream DS is received that requires more extensive reformatting/preprocessing in operation 126. Typically, a document data stream has one or more aspects in common with respect to the different documents represented, such as document type, overall topic, and the like; however, documents from diverse collections/sources can alternatively be utilized. In one particular example further described hereinafter, a document type of data stream DS is directed to news stories of the variety that could be provided by newswire source 52.

For a document data stream of this type, operation 126 includes a term standardization routine in which a set of terms S is determined for later processing. Such standardization can include typical stemming, identification of phrases (i.e., word sequences that should be treated as one unit), and mapping known synonyms to a common canonical form. Typically, functional words or 'stop' words will be removed when determining this standardized lexicon. Functional words include modifiers such as 'a', 'the', and 'this' that are necessary for grammatical comprehension but do not directly contribute to a concept. Functional words can be removed by comparing them with a list of known functional terms—a 'stop-word' list. Alternatively, if a stop-word list is not available (for example, if a foreign language is being analyzed for which a stop-word list is not known), functional words can be identified automatically via a topicality calculation executed with system 20.

In such a calculation for a given term, let A be the number of documents that contain the term. Let N be the number of documents in the test collection, and let T be the total number of times the term occurs in the collection. Then if the term is distributed randomly T times across the N documents, it would be expected to occur in $$E = N - N\left(1 - \frac{1}{N}\right)^T$$

documents. If the term occurs in significantly more documents than expected by chance, it is considered to be regularly distributed, typical of a functional word. Thus, functional terms can be automatically identified as those terms for which $$\frac{A}{E} > 1 + \lambda,$$

where $\lambda$ is a threshold that may have been selected based on previous experience, or based on statistical considerations. In one embodiment, $\lambda=0.25$ has been found to be adequate for English documents. A. Bookstein, S. T. Klein, and T. Raita, "Clumping Properties of Content-Bearing Words" *Journal of the American Society for Information Science* (published on the world wide web 1998) is cited as a source of background information concerning such approaches.

Further, for a text document type of data stream DS, operation 126 can generate a document feature space as a function of the term set S. In one form, the resulting data vectors each represent a different document and are each organized to contain an array of real numbers. These real numbers each represent a weighted strength of one of the terms S. A sequence of vectors corresponding to a quantity desired to present an initial visualization is normalized to provide a corresponding document matrix.

In one newswire example, a corpus was used consisting of 3,298 news articles collected from open sources during the date range of Apr. 20-26, 1995. This corpus has a strong theme associated with the bombing of the U.S. Federal Building in Oklahoma, the O. J. Simpson trial, and the French elections. The corpus was processed to identify a set of content-bearing words from the documents. Words separated by white spaces in a corpus are evaluated within the context of the corpus to assess whether a word is interesting enough to be a topic. The co-occurrence or lack of co-occurrence of these words in the documents was used to evaluate the strengths of the words. From this set of words, document vectors were constructed for the newswire corpus. In this instance, a document vector, which was an array of real numbers, contained the weighted strengths of the interesting words found in the corresponding document. These vectors were normalized and the resulting document matrix represented the corpus. For this example, a document vector dimension of 200 numbers (elements) was utilized. Because there are 3,298 documents in the newswire corpus, the dimensions of the document matrix are 3,298×200. Correspondingly, 200×3298=659,600 data elements are in this matrix.

Document vectors can be provided in the form of a term-by-document frequency matrix; where, the $(ij)^{th}$ entry contains the frequency of the $i^{th}$ term in the $j^{th}$ document, an example of which follows in Table 1:

TABLE 1

|  | Doc 1 | Doc 2 | Doc 3 | Doc 4 | Doc 5 | Doc 6 | Doc 7 | Doc 8 | Doc 9 |
|---|---|---|---|---|---|---|---|---|---|
| Football | 3 | 1 | 0 | 2 | 0 | 0 | 1 | 0 | 0 |
| Ball | 0 | 5 | 0 | 0 | 0 | 3 | 3 | 0 | 0 |
| Sports | 2 | 0 | 3 | 3 | 0 | 2 | 5 | 3 | 2 |
| Basketball | 0 | 0 | 4 | 1 | 3 | 0 | 0 | 1 | 2 |
| Game | 0 | 0 | 1 | 1 | 0 | 0 | 0 | 2 | 0 |
| Skate | 0 | 0 | 0 | 0 | 1 | 0 | 0 | 0 | 0 |

It should be understood that in other embodiments, a term-by-document frequency matrix can include fewer, but typically, many more documents and/or terms. Alternatively or additionally, the frequency can be weighted based on one or more criteria, such as an information-theoretic measure of content or information contained in a given term and/or document. In one such form, term frequencies are weighted by a measure of their content relative to their prevalence in the document collection. To standardize for documents of varying sizes, the columns of a weighted term-by-document frequency matrix might also be normalized prior to analysis.

A term-by-document frequency matrix is often useful in discovering co-occurrence patterns of terms, which can often correspond to underlying concepts. First-order co-occurrence patterns relate terms that frequently occur together in the same documents; second-order co-occurrence patterns relate terms that have similar first-order co-occurrence patterns, so that two terms can be related by second-order co-occurrence even if they never occur together in a document. As previously described, co-occurrence aspects can be used in determining the strength of words for potential inclusion in the document data vectors.

From operation 126, process 120 continues with operation 130. Alternatively, operation 130 is reached directly, bypassing operation 126, if the test of conditional 124 is affirmative (true). In operation 130, a baseline visualization is generated from the document matrix received from the preprocessing of operation 126 or directly from data stream DS. The visualization can be completely or partially displayed with one or more of output devices 26. In one form, the visualization is created by reducing the relatively high-dimension document matrix into a visualization of fewer dimensions using Multi-dimensional Scaling (MDS). MDS includes a variety of scaling techniques subject to categorization as classical or nonclassical, metric or nonmetric, and the like. Adhering to the terminology in the book: *Multidimensional Scaling* by Cox, T. F. and Cox, M. A. A. (1994, Chapman & Hall); both the classical MDS approach and the least-squares MDS approach (alternatively designated a Sammon projection) were used to experimentally demonstrate various aspects of the present application. Beside this reference, other sources of various MDS algorithms, procedures, and/or routines include International Patent Application Publication No. WO 00/39705, published 6 Jul. 2000; Buga & Swaywe et al., "XGvis: Interactive Data Visualization with Multidimensional Scaling" (Published 29 Nov. 2001); "Evaluating Similarity-based Visualizations as Interfaces for Image Browsing", Technical Report No. 543, University of Cambridge Computer Laboratory, (published September 2002); and U.S. Pat. No. 6,615,211 B2 to Beygelzimer et al. It should be understood, that in other embodiments of the present invention, different scaling techniques could be alternatively or additionally utilized. As an option, clustering (such as K-mean clustering) and/or various other techniques can be utilized to modify the MDS visualization as displayed. Further information regarding such clustering techniques and corresponding algorithms may be found in Seber, G. A. F., *Multivariate Observations*, (1984, John Wiley & Sons).

Figure 3:
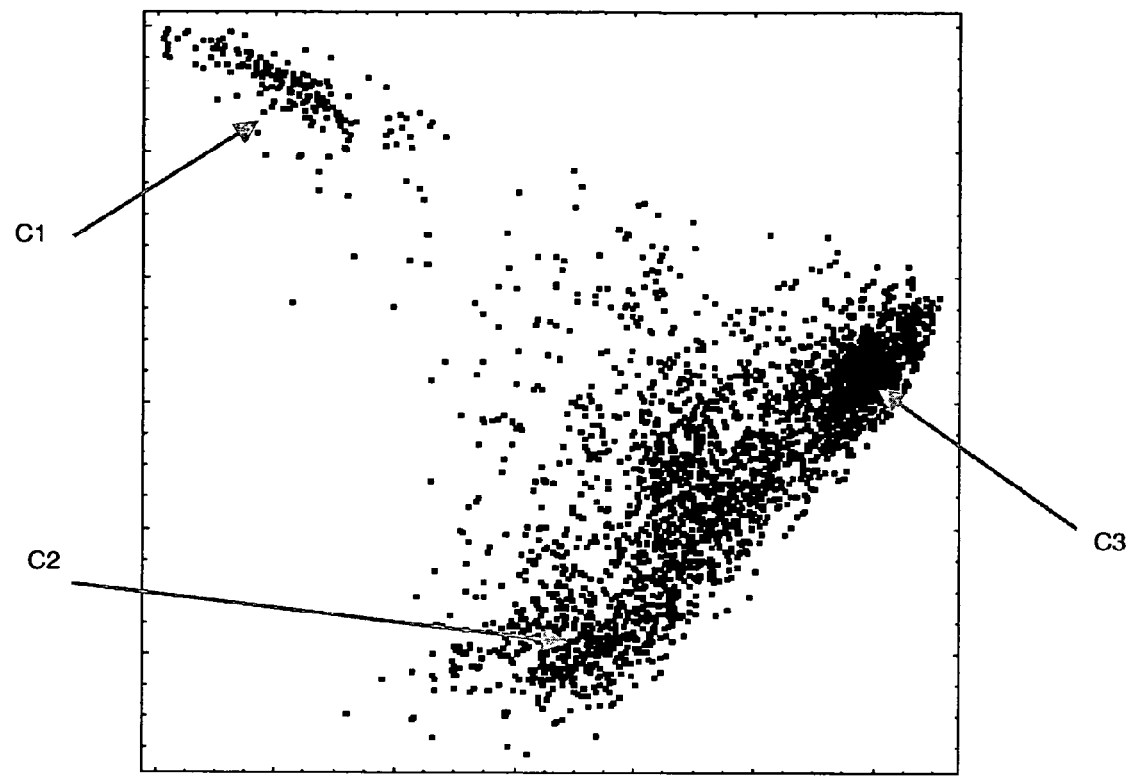
FIG. 3 is a scatter plot illustrating a typical baseline visualization generated with the process of FIG. 2.

Given a high-dimensional dataset (such as a set of similar data objects represented by numerical vectors), MDS generates a low-dimensional configuration—like a 2-D scatter-plot—such that the pairwise distances between any points in the low-dimensional space approximate the similarities between the vectors that represent the points. In one nonlimiting example, FIG. 3 shows a scatter plot with 3,298 points (each point represents a document vector) generated by a classical MDS routine using the newswire corpus example previously described. In this example, documents with similar themes are clustered together, which are designated cluster C1, cluster C2, and cluster C3. Clusters C1, C2 and C3 correspond to the O. J. Simpson Trial, French Elections, and Oklahoma bombing, respectively. Alternatively or additionally, in other embodiments, the different clusters can be represented by different colors or plot point symbols, a different scaling technique can be used, and/or a presentation format other than a scatter plot may be employed.

In response to a degree of change in the data stream DS influx or receive rate relative to the processing rate of system 20, adaptive visualization according to one embodiment of the present invention is based on data stratification that substantially reduces the processing time of the data stream DS and yet generally maintains the overall integrity of the visualization output. In one particular version, if the primary data processing route has overflowed, the data from data stream DS is re-directed to a secondary route. This second route generates a coarser version of visualization but at a much faster processing rate. And if the secondary route also overflows, the data from data stream DS is re-directed to a tertiary route and so on. The stratification strategies of the present invention include vector dimension reduction, vector sampling, and eigenvector data fusion.

Figure 4:
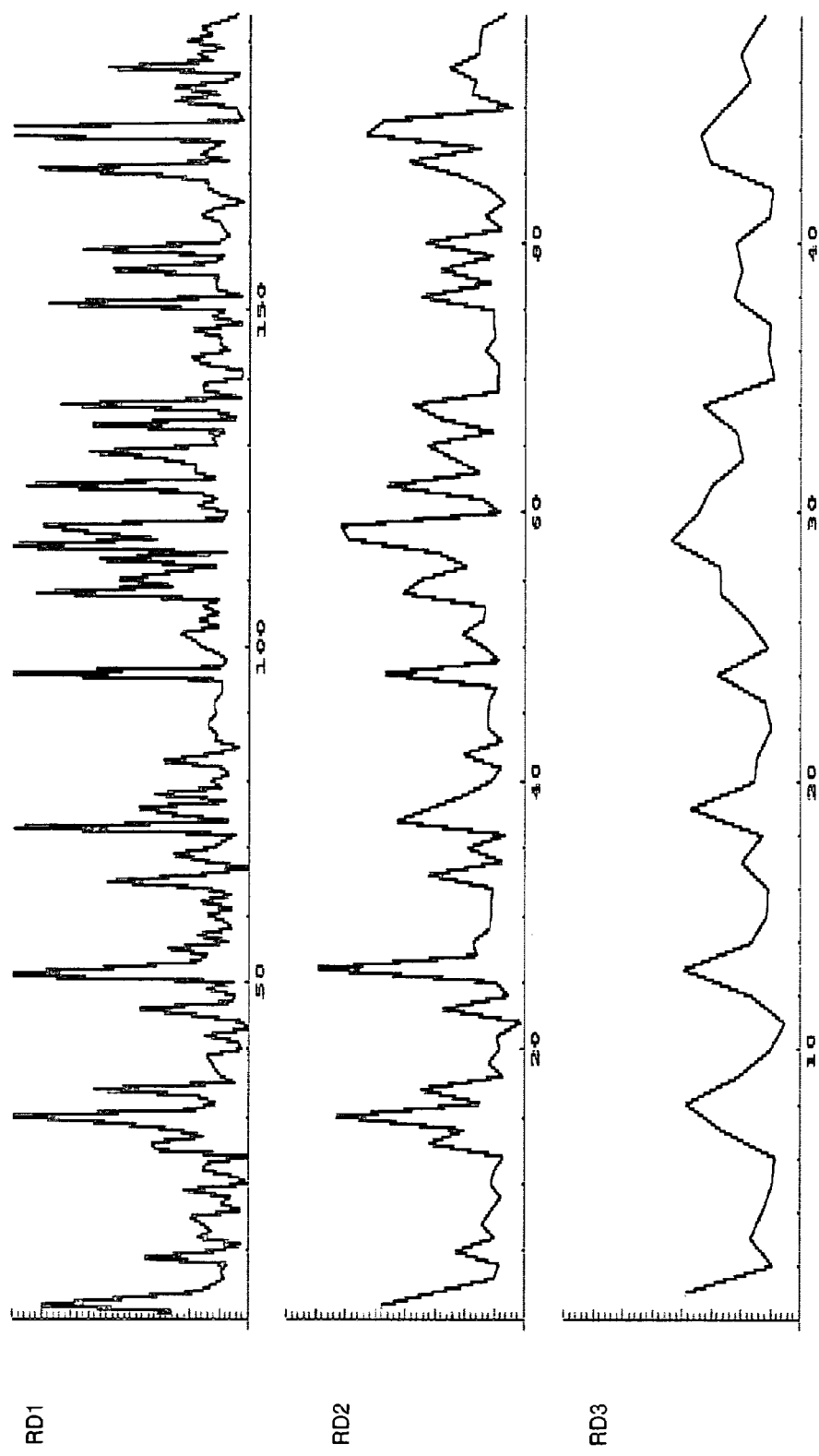
FIG. 4 is an illustration of three comparative graphs illustrating different levels of dimension reduction by a wavelet decomposition routine included in the subroutine of FIG. 8.

Before describing process 120 further, these strategies are each described in more detail. Vector dimension reduction is directed to decreasing the physical size of the data vectors but maintaining most of their contents of interest. In one form, this reduction is accomplished by applying dyadic wavelets to decompose individual vectors (and thus compress them) progressively. It has been found that Haar wavelets perform well, and generally outperform all other wavelet candidates in processing time, which is generally desirable. FIG. 4 shows an example of two consecutive wavelet decompositions on a document vector randomly selected from the newswire corpus. In FIG. 4, RD1 designate the original vector with 200 terms; RD2 designates a first wavelet decomposition resulting in a data vector with 100 terms; and RD3 designates a second wavelet decomposition resulting in a data vector with 50 terms. Because Haar belongs to the dyadic wavelet family, one wavelet application will reduce the vector dimension by 50%. More information on wavelet decomposition routines and/or techniques can be found in Strong and Nguyen, *Wavelets and Filter Banks*, (1997 Wellesley-Cambridge Press); and Gilbert & Kotides et al., "Surfing Wavelets on Streams: One Pass Summaries for Approximation Aggregate Queries," Proceedings of 27$^{th}$ Very Large Data Bases (VLDB) Conference, pp. 541-554 (2001).

Figure 5:
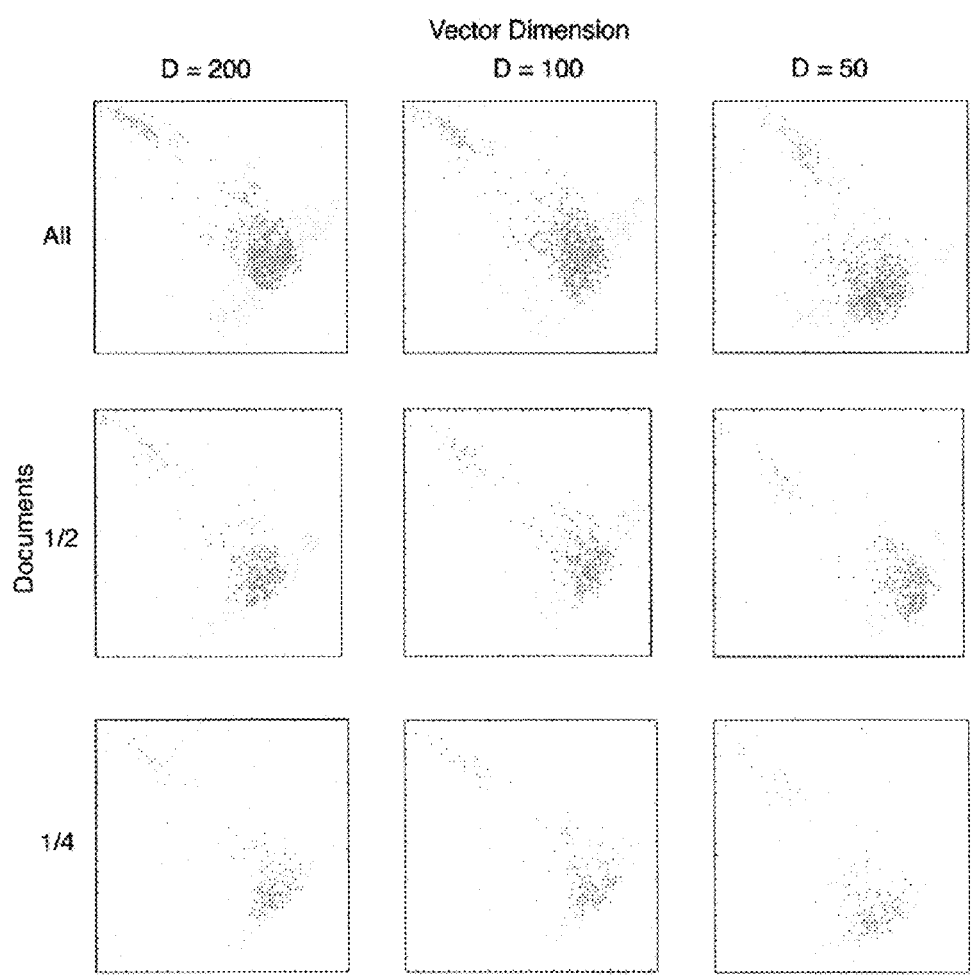
FIGS. 5-7 each provide a comparative matrix of 9 different, computer-generated, grayscale scatter plots illustrating similarity between different data element reduction techniques.

While the example in FIG. 4 shows the feature-preserving property of wavelets on individual vectors, the next example demonstrates the accuracy of the resultant vectors in generating visualizations using MDS. Referring to FIG. 5, a comparative, grayscale matrix of nine computer-generated scatter plots is shown. The scatter plot in the first row and first column of FIG. 5 is the same scatter plot shown in FIG. 3 to which a K-mean process has been applied to subdivide the plot points into four clusters. Each cluster receives a unique color (magenta, cyan, grey, and yellow) shown in grayscale in FIG. 5. Generally, the magenta cluster is located in the upper left corner of the scatter plot, the cyan cluster is located closest to the bottom, the yellow cluster is closest to the right hand side, and the grey cluster is positioned between the cyan and yellow clusters, as indicated by different shades of gray.

Using a wavelet decomposition routine, the dimensions of the document vectors are progressively reduced from 200, to 100, and then to 50 going from left-to-right across the first row of scatter plots in FIG. 5. Each reduction is followed by an MDS routine. Although the orientations and spreads of the scatter points vary slightly from left to right in the first row, major features such as clustering and separation remain.

The second stratification strategy is to reduce the number of data vectors based on sampling. A regular sampling technique was used to obtain an even data distribution. Other sampling options such as a statistical-based distribution, just to name one alternative, can also be applied. With the 3,298× 200 newswire document matrix previously described, color identities are assigned to each scatter point; however, instead of reducing the dimensions of the vectors, this time the number of document vectors is progressively reduced by 50% every time using a regular sampling method. In FIG. 5, these reductions of ½ and ¼ of the number of documents for the original vector dimension of 200 are shown in the scatter plots in the second and third rows of the first column, respectively. The number of data elements in a matrix based on sampling is correspondingly reduced relative to the unsampled 3,298× 200 matrix. The three visualizations corresponding to different sampling in FIG. 5 demonstrate that even though there is a substantial reduction in the number of vectors for the MDS process, the shape or spread of the points remains generally the same. This phenomenon can be explained by the stability of the two most dominant eigenvectors generated by the highly related document vectors.

To improve the visualization for comparison and evaluation, the two approaches are progressively combined and concatenated in the scatter plots of FIG. 5, which shows the consequences of reducing document vectors (scatter plot matrix rows) versus reducing vector dimensions (scatter plot matrix columns). Accordingly, to complete the description of FIG. 5, the scatter plots in the second and third rows of column 2 result from ½ and ¼ sampling with vector dimension reduction to 100, respectively; and the scatter plots in the second and third rows of column 3 result from ½ and ¼ sampling with vector dimension reduction to 50. Given that ¼ sampling truncates to 824 vectors, the greatest degree of reduction results in (50×824)=41,200 data elements for the scatter plot in the lower-most, right-hand corner; relative to 659,600 data elements for the full matrix. Further, these results indicate that although the shape of the point distribution changes to some extent, the overall integrity of the visualizations such as clustering and separation remain intact. The fact that the cluster borders remain clear and crisp in all nine scatter plots of the matrix indicates desired results from these strategies.

Considering computational performance, Mathematica 4.2 [Mathematica 2003] running on a Macintosh G4 with 1 GB memory was utilized to report relative computation performance. Table 2 shows the results. In Table 2, the top row shows the number of dimensions in the document vectors and the left column shows the number of document vectors included in the computation. The other nine numerical entries are computation time measured in wall clock seconds. The corresponding scatter plot of each entry is shown in FIG. 5.

TABLE 2

|  |  | Vector Dimension | | |
| --- | --- | --- | --- | --- |
|  |  | 200 | 100 | 50 |
| Documents | All (3298) | 34.90 s | 9.50 s | 2.62 s |
|  | ½ (1649) | 14.80 s | 4.78 s | 1.52 s |
|  | ¼ (824) | 8.83 s | 2.58 s | 0.89 s |

The results in Table 2 show a 92.5% time reduction (from 34.9 s to 2.62 s) by compressing the vectors from 200 to 50 dimensions. The table further demonstrates a notable 97.5% time reduction (from 34.9 s to 0.89 s) by simultaneously reducing the number of vectors from 3,298 to 824 in the computation.

Figure 6:
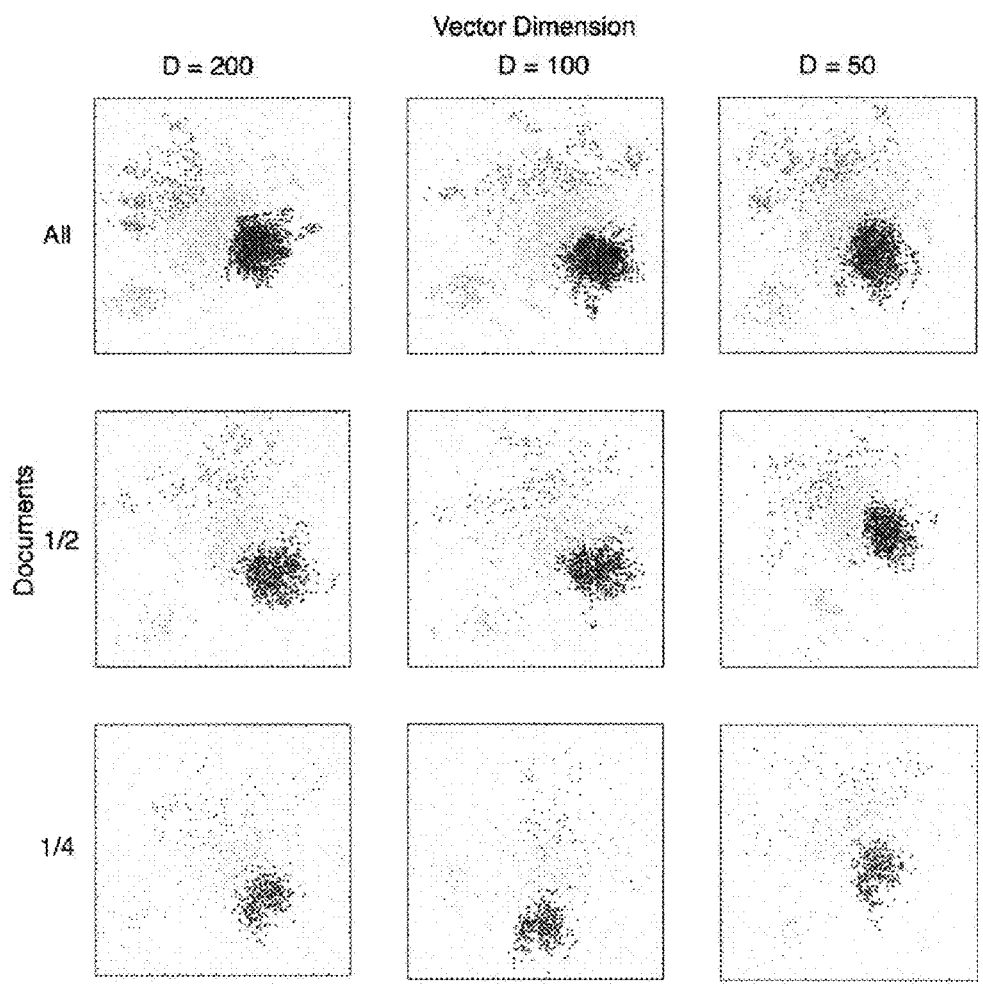

To show the flexibility of the adaptive visualization technique, a second scaling example using a least-squares MDS technique known as a Sammon Projection was performed. Classical MDS treats similarity between two vectors directly as Euclidean distances whereas least-squares MDS takes it as the least squares of a continuous monotonic function. With regard to visualization, one difference between a Sammon Projection and a classical MDS projection is that the former usually has fewer overlapping clusters due largely to its non-linear mapping approach. FIG. 6 shows a re-execution of the scatter plot matrix of FIG. 5 using the Sammon Projection technique. Although the visualization results look different from those in FIG. 5, the relative impact of stratification is very much like that of FIG. 5. Most of the scatter points are able to maintain their original positions and orientations. The grayscale representation of FIG. 6 corresponds to the four point colors (red, green, blue, and orange) which are assigned after a K-mean clustering process. In the FIG. 6 scatter plots, the red points are closest to the lower right corner, the green points are centrally located, the blue points are closest to the upper left corner, and the orange points are closest to the lower left corner.

The adaptive visualization technique can also be used to visualize other types of data streams DS. In a further experiment, efficacy with image streams was demonstrated as shown in the comparative, grayscale matrix of nine scatter plots in FIG. 7. For FIG. 7, a remote sensing imagery sequence was used that was taken by an aircraft over the semi-desert area in Eastern Washington. The aircraft was equipped with a hyperspectral sensor that could take multiple images of the same locations simultaneously in different spectral bands. The image in each spectral band (or layer) has 32×128=4096 pixels. A pixel vector, in this case, contains image information of the same pixel position across the 169 spectral bands, which is used as the data vector. In other words, each pixel position establishes a pixel vector which collectively provide a matrix for baseline visualization in operation 130. Because there are 4,096 pixels in each image, the dimensions of the pixel matrix are 4,096×169 (4,096× 169=692,224 data elements per matrix).

Figure 7:
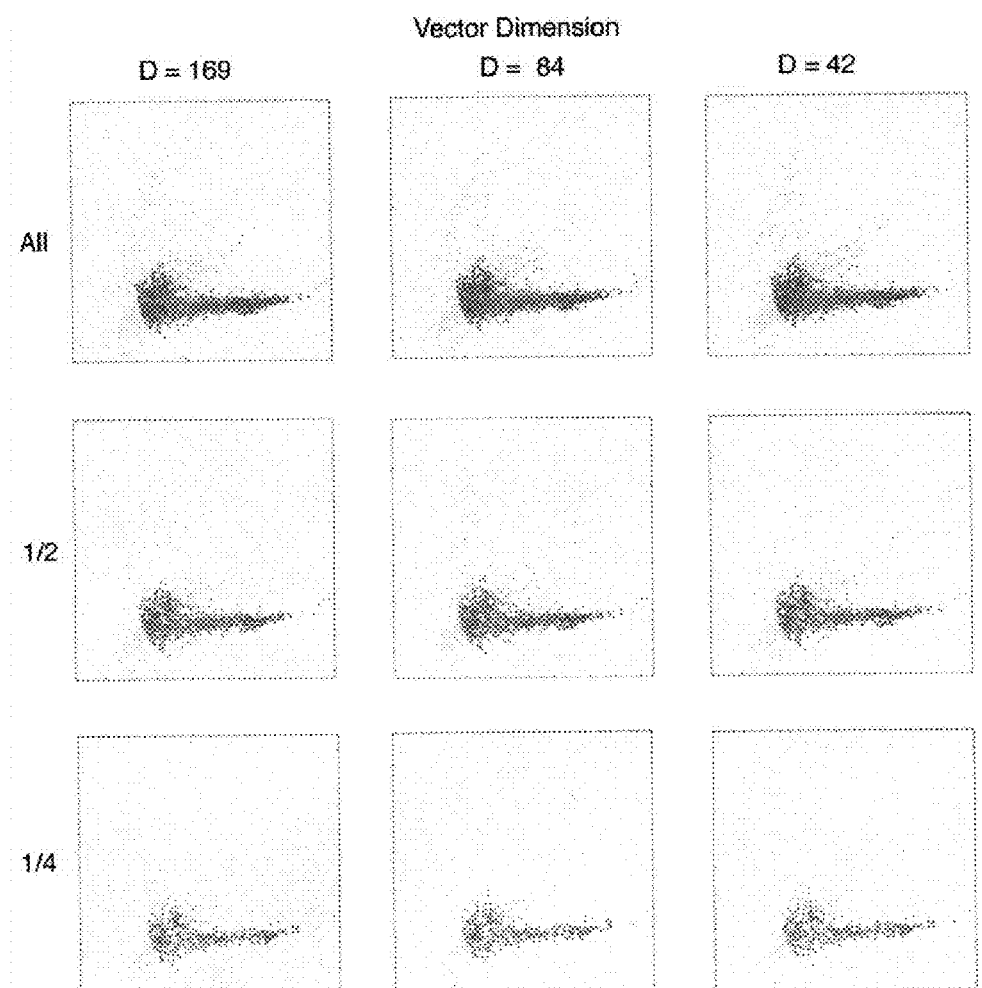
Figure 8:
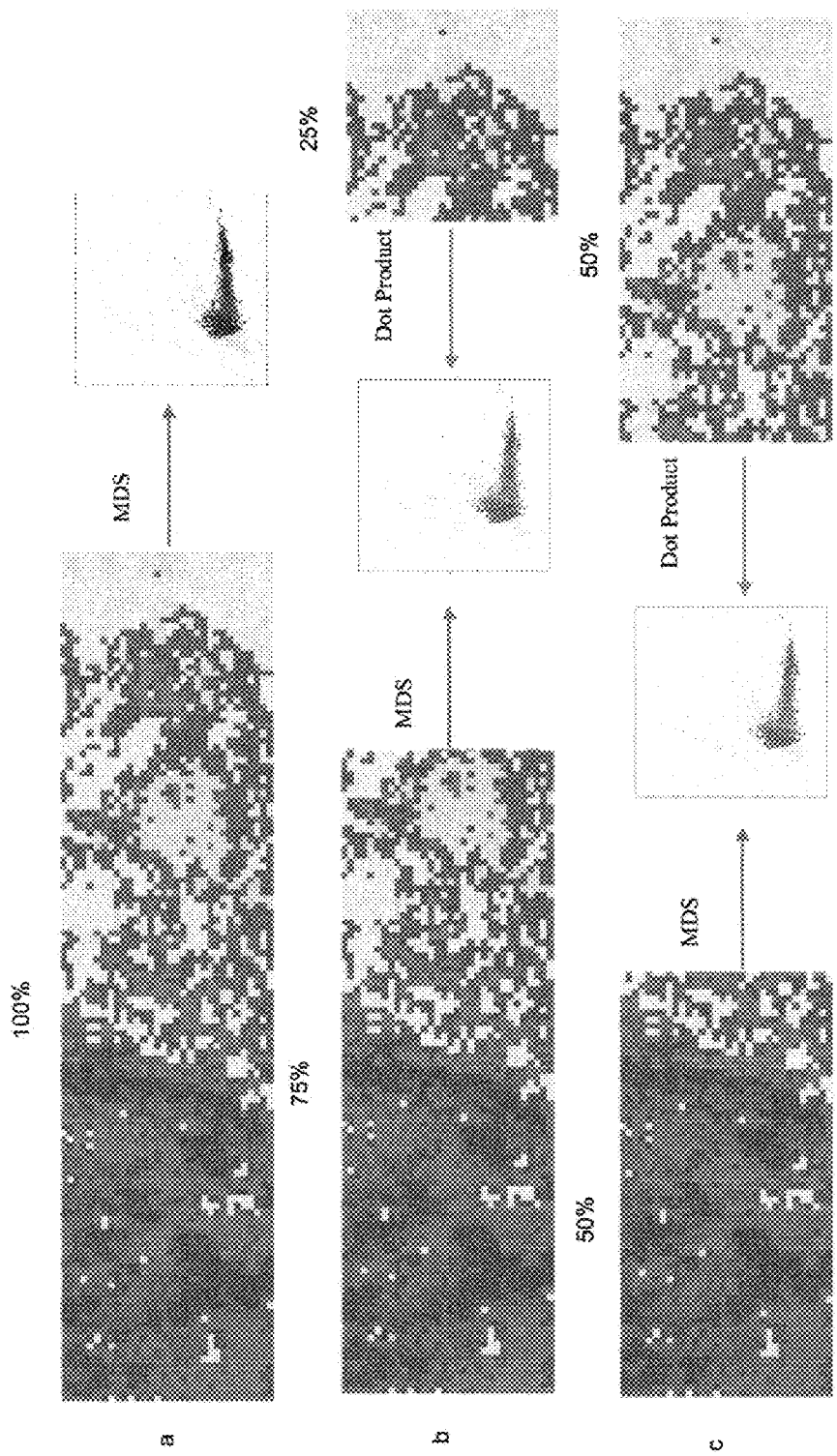
FIG. 8 is a series of computer-generated images illustrating certain aspects of a visualization updating procedure.

One common motivation to include all spectral bands in the image analysis is that subjects appearing identical in one spectral band (like visible color) may be very different from each other if all possible spectral bands are considered. This example shows that the same stratification strategies can be favorably applied to analyze imagery streams. The scatter plots of FIG. 7 are obtained by first applying classical MDS for scaling the pixel vectors followed by a K-mean process to assign unique colors to eight scatter point clusters. The vectors are then progressively stratified with vector dimensions of 169, 84, and 42 for the first, second, and third columns, respectively, and vector samples of all, ½, and ¼ for the first, second, and third rows, respectively. In addition to the close proximity among the nine scatter plots like that shown in previous examples, a different approach to evaluate the accuracy of the results can also be demonstrated. By mapping the colors of individual pixels from FIG. 7 back to the original image pixels, one can verify all nine scatter plots correctly identify different features of the original image and separate them into different clusters. The resulting image is shown in FIG. 8 as the left, uppermost rectangular image in grayscale.

In addition to visual techniques of scatter plot comparison, computational techniques are also desired. In statistics studies, a class of techniques for matching two similar n-D configurations and producing a measure of the match is known as Procrustes analysis. Procrustes analysis can match scatter plots in any number of dimensions assuming the one-to-one correspondence information among the scatter points is known. Generally, given two 2-dimensional scatter plots X and Y where X and Y are (n×2) matrices, the stages to match X to Y and report a measure of the match using Procrustes analysis are as follows:

1. Translate the two scatter plots so that they both have their centroids at the Origin—by subtracting each point with its mean coordinates of the scatter plot.
2. Rotate X to match Y by multiplying X with $(X^T Y Y^T X)^{1/2} (Y^T X)^{-1}$.
3. Dilate scatter points in X by multiplying each of them with $tr(X^T Y Y^T X)^{1/2}/tr(X^T X)^T$.
4. The matching index between X and Y as originally input=$1-\{tr(X^T Y Y^T X)^{1/2}\}^2/\{tr(X^T X)tr(Y^T Y)\}$.

The approach of this analysis technique is to seek the isotropic dilation; and the translation, reflection, and rotation required to match one scatter plot with another. The matching index calculated in stage 4 ranges from zero (best) to one (worst).

Table 3 shows the results of Procrustes analyses that were carried out on the corpus scatter plots in FIG. 5. The very low index values (from 0.016 to 0.14) in Table 3 indicate that all eight scatter plots generated by stratified vectors are highly similar to the full resolution scatter plot that has all 3,268 vectors with a vector dimension of 200. These highly similar results and the notable 97.5% time reduction in generating one of them (reported in Table 2) indicate that the two demonstrated stratification approaches are viable solutions in visualizing transient data streams.

TABLE 3

|  | 200 | 100 | 50 |
|---|---|---|---|
| All (3268) | 0.0 (SELF) | 0.0224058 | 0.0841326 |
| ½ (1649) | 0.0162034 | 0.0513420 | 0.1114290 |
| ¼ (824) | 0.0329420 | 0.0620215 | 0.1417580 |

Matching results for the remote sensing imagery scatter plots shown in FIG. 7 are presented in Table 4. The matching indices listed in Table 4 are even lower than those listed in Table 3. Even the worst case (¼ dimension, ¼ vectors) accomplishes an identical matching index up to four significant figures. Notably the greatest degree of reduction results in a scatter plot of (42×¼×4096)=43,008 data elements versus 692,224 data elements for the full resolution matrix.

TABLE 4

|  | 169 | 84 | 42 |
|---|---|---|---|
| All (4096) | 0.0 (SELF) | 0.000004106 | 0.0000565361 |
| ½ (2048) | 0.000000279 | 0.000004136 | 0.0000567618 |
| ¼ (1024) | 0.000004299 | 0.000007314 | 0.0000577721 |

While vector dimension reduction and sampling strategies focus on the use of stratified vectors in place of full-resolution data sets to generate fast and accurate MDS scatter plots, such strategies do not eliminate the requirement to re-process the entire dataset whenever new items arrive. In another aspect of the present invention, a strategy to update an existing visualization without re-processing the entire dataset is provided. As previously noted, the visualization subspaces spanned by the two dominant Eigenvectors are resilient to changes. Furthermore, considering this characteristic, the hyperspectral imagery dataset is used to evaluate the similarity between the eigenvectors (and the corresponding scatter plots) generated from local image regions versus the entire dataset. To provide identities to individual pixels, the image representation shown in the upper left corner of FIG. 8 was utilized.

Specifically, a MDS scatter plot using the pixel vectors from the entire hyperspectral imagery was generated (upper left scatter plot of FIG. 7) that is also shown as the upper most scatter plot in FIG. 8. The image was cropped into three generally equal, square-shaped regions to generate three corresponding MDS scatter plots (not shown) using only the pixel vectors from the corresponding cropped image regions. These cropped image regions were selected because they contain diverse image features as reflected by different pixel colors. Three more scatter plots (not shown) were generated using the corresponding pixel vectors found for the cropped image regions and Eigenvectors computed from the entire hyperspectral imagery (instead of the local cropped windows). These Eigenvectors can be determined by reusing the coordinates of scatter plot points from the uppermost scatter plot, which is constructed using Eigenvectors from the entire imagery. The resultant scatter plots show that the three corresponding pairs closely resemble each other. This visual-based conclusion is consistent with near zero Procrustes matching indices of 0.000718745, 0.0000381942, and 0.000683066 for the three pairs; respectively, which imply a close similarity among the pairs.

Because the most dominant Eigenvector is the line though the centroid of the scatter points along which the variance of the projections is greatest (not necessarily the direction of the greatest ranges or extent of the data) and the second-most dominant Eigenvector is orthogonal to the most dominant Eigenvector, these Eigenvectors tend to be robust for changes unless a substantial amount of disparate information is added.

Figure 9:
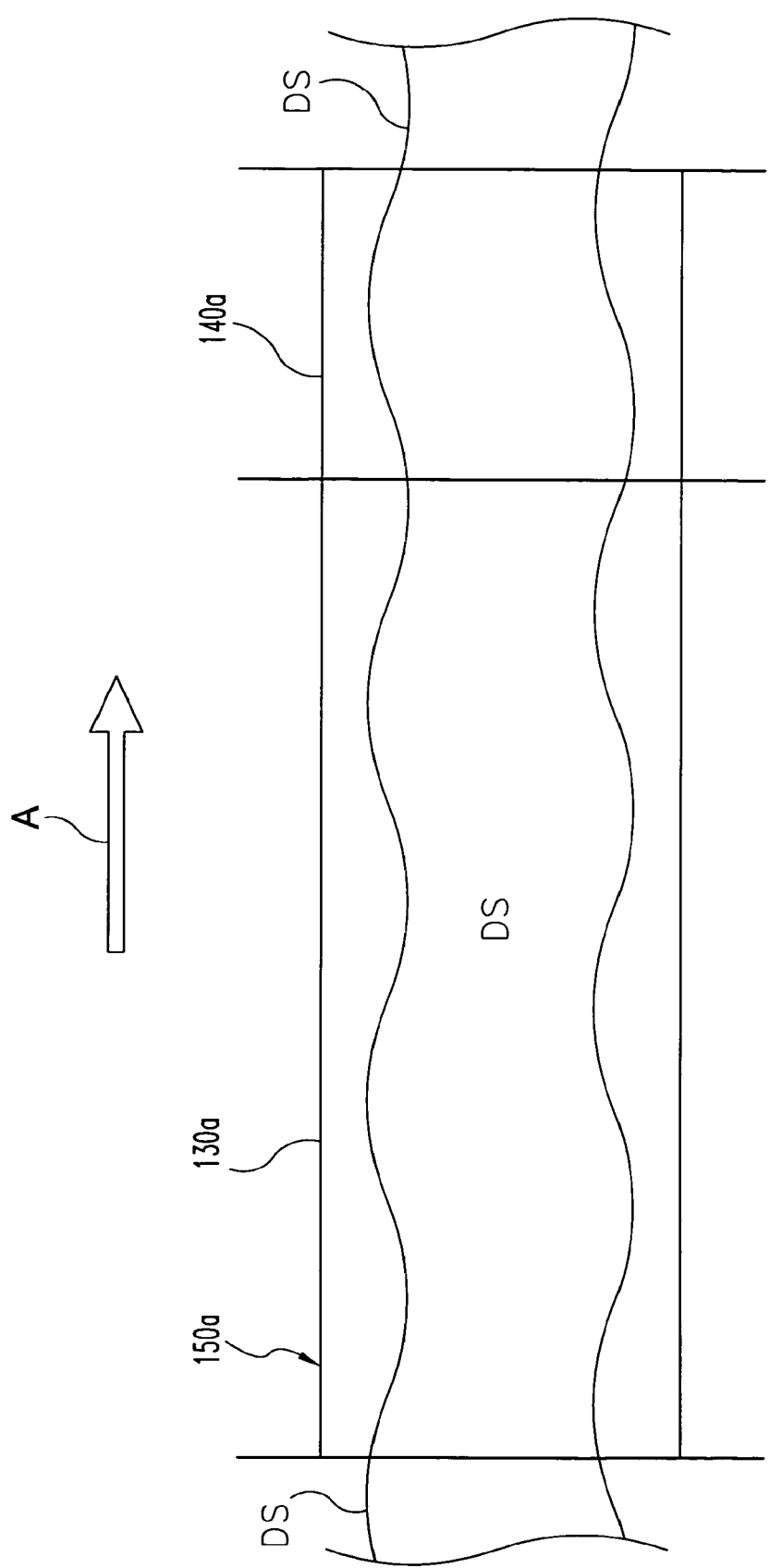
FIG. 9 is a diagram illustrating certain details regarding the procedure of FIG. 8.

FIG. 9 schematically represents multiple sliding window arrangement 150*a* relative to data steam DS. Arrangement 150*a* includes two data windows 130*a* and 140*a*. Arrangement 150*a* moves along data stream DS in the direction indicated by arrow A over time, with window 140*a* receiving a more recent data segment than window 130*a*. It should be understood that window 130*a* is longer than window 140*a* corresponding to a greater span of data (data amount) from data stream DS compared to the data span (data amount) of window 140*a*. In operation, the Eigenvectors for the greater data span of window 130*a* are determined for which a corresponding scatter plot visualization is generated with MDS. These Eigenvectors are used to update this scatter plot by projecting newly arrived individual vectors from the shorter window 140*a* onto the visualization subspace as the dot-product between the incoming data vectors and the Eigenvectors. So instead of repeatedly processing the classical MDS function of the operational order ($O(n^3)$) or the ($O(n\sqrt{n})$) version whenever new information arrives, one can now obtain a computationally faster visualization update by carrying out a ($O(m)$, m=vector dimension, m<<n) dot-product operation to determine the point location of the new information in the scatter plot.

Using the same hyperspectral imagery to demonstrate, the top row "a" of FIG. 8 shows the case when 100% of the pixel vectors corresponding to the top most image are used to generate a scatter plot by MDS, as shown in the top most right-hand corner. In the middle row "b" of FIG. 8, 75% of the pixel vectors (represented by the middle left-hand side image) are projected onto the scatter plot by MDS, as shown in the middle. The other 25% are projected by a dot-product function using the Eigenvectors of the first 75%, as represented by the image on the right-hand side of the middle row b. In row "c" of FIG. 8, 50% of the pixel vectors are projected by MDS and the other 50% are projected according to the Eigenvectors of the first 50%, as represented by the lower-most scatter plot situated between the image portions designated with "50%" on either side.

Notably, the scatter plots of rows a, b, and c in FIG. 8 visually appear similar and the low Procrustes indices in Table 5 computationally confirm that these three scatter plots are close to one another. These near-zero matching indices also validate that one can obtain a fast and accurate overview of the entire dataset without the requirement of re-processing the entire dataset.

TABLE 5

| FIG. 8 Rows | a versus b | a versus c |
|---|---|---|
| Matching Index | 0.00123405 | 0.00233882 |

Procrustes analysis can be used to evaluate the errors between a full-resolution standard scatter plot and those based on multiple sliding windows. Alternatively, to speed-up error-tracking, the full-resolution standard scatter plot can be replaced with a fast and accurate substitute like one using reduced dimension and/or sampled data vectors.

The results in Table 2 show that up to 92% of computation time (from 34.9 s to 2.62 s) can be saved by compressing the dimensions of 3,268 vectors by 75%. And the results in Table 4 show that a 75% reduced data matrix (dimension reduced from 169 to 42) can still be about as accurate as the full resolution one. Because of this faster error checking process, one can now afford to carry out error estimation more frequently and thus improve the overall quality of the analysis.

Although data vector dimension reduction, data vector sampling, eigenvector projection, and corresponding error-tracking techniques can be utilized independently, in other embodiments, one or more of these approaches can be combined. Returning to FIG. 2, an overview of process 120 is provided based on the following stages:

1. When influx rate<processing rate, use MDS to re-process the entire dataset when new information arrives.
2. When influx rate>processing rate, halt the MDS process.
3. Use a multiple sliding window approach to update the baseline scatter plot with the new information. Repeat stage 3 optionally subject to a predefined number of updates (repeats).
4. Use the stratification approach to come up with a fast overview of the entire dataset.
5. Use the stratified overview to evaluate the accumulated error generated by the multiple sliding windows method using Procrustes analysis.
6. If an error threshold is reached, go to stage 1 above, otherwise go to stage 3.

Accordingly, from operation 130, process 120 proceeds to conditional 128. Conditional 128 tests whether the data receive rate for data stream DS is less than the MDS processing rate for system 20. If the test is affirmative (true), then process 120 loops back to stage 130, performing the MDS calculation with the new data received and presenting a new baseline visualization corresponding to this calculation. This re-processed MDS-based visualization corresponds to the longer data span of window 130a of the window sliding arrangement 150a.

Figure 10:
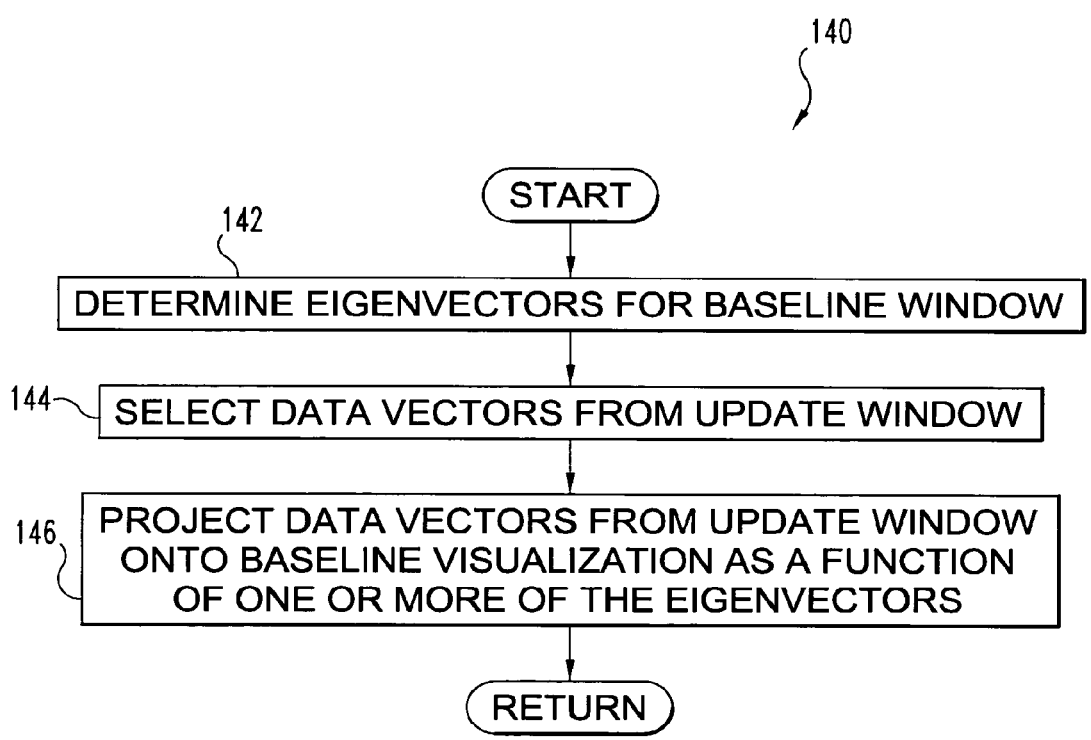
FIG. 10 is a flowchart illustrating certain details of a routine for the process of FIG. 2.

On the other hand, if the data receive rate equals or exceeds the processing rate, an alternative strategy is utilized in the form of visualization update routine 140 as further depicted in FIG. 10. Routine 140 is based on the data fusion concept that projects new data directly onto the baseline visualization using the two-most dominant eigenvectors of the baseline visualization. Specifically, in operation 142, the two-most dominant eigenvectors for the baseline visualization are determined. Generally, this operation can be performed once for each baseline visualization, and so alternatively could be performed as part of operation 130. From operation 142, routine 140 proceeds to operation 144. In operation 144, the newly received data vectors from the data stream spanned by the shorter sliding window 140a are selected. Next, in operation 146, these newly received data vectors are each projected onto the baseline visualization as a function of the eigenspace of the baseline visualization. Specifically, each new data vector is projected as the dot product of each of the two most dominant eigenvectors determined in operation 142. From operation 146, routine 140 returns.

Returning to FIG. 2, process 120 continues with conditional 132. Conditional 132 tests whether to evaluate error that may result from the projection approach of routine 140 relative to MDS processing. This test may be triggered based on the number of data vectors projected on the baseline visualization or automatically tested after every execution of routine 140. In one particular implementation, each execution of routine 140 only projects a single data vector, and conditional 132 is triggered once for every predefined number of executions of routine 140. In still other embodiments, error checking may be absent, or only optionally applied.

If the test of conditional 132 is affirmative (true), a similarity analysis is preformed in operation 150. This operation may include comparing the baseline visualization before and after new data vector projection by Procrustes analysis and/or generating one or more overviews of the baseline visualization for comparison in accordance with routine 160, which is more fully explained hereinafter. From operation 150, conditional 134 is reached. If the test of conditional 132 is negative (false), operation 150 and conditional 134 are bypassed, and process 120 continues with conditional 138.

Conditional 134 tests whether an error threshold has been reached as determined with operation 150. If the test of conditional 134 is affirmative (true), process 120 returns to operation 130 to generate a new baseline visualization representative of data stream DS. If the test of conditional 134 is negative (false), conditional 138 is reached.

Conditional 138 tests if an overview visualization generated with one or more vector data reduction techniques is desired. If the test of conditional 138 is affirmative (true), routine 160 is executed which is shown in greater detail in the flowchart of FIG. 11. If the test of conditional 138 is negative (false), routine 160 is bypassed, and process 120 continues with conditional 172.

Figure 11:
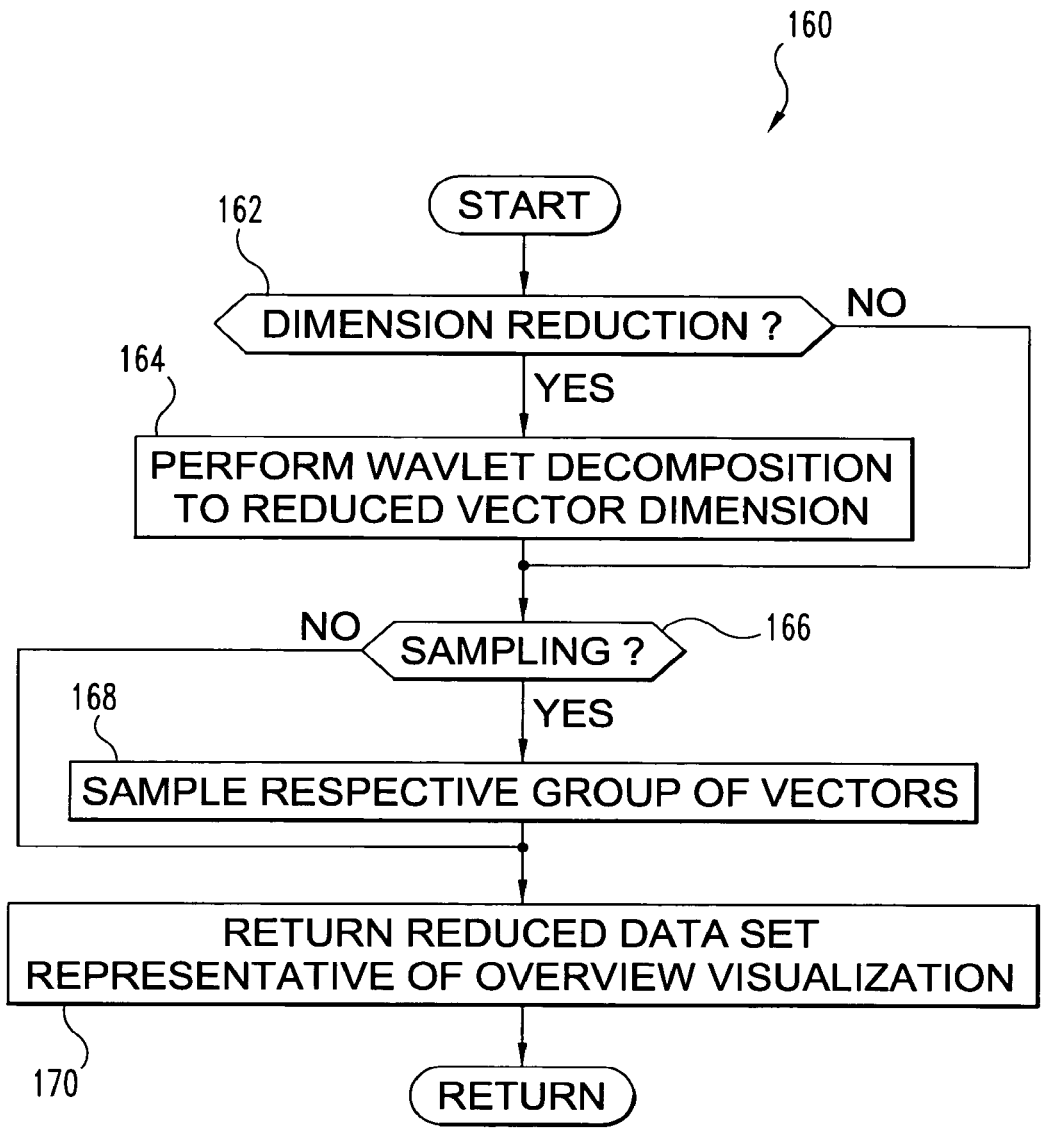
FIG. 11 is a flowchart illustrating certain details of another routine for the process of FIG. 2.

In FIG. 11, routine 160 begins with conditional 162 that tests if dimension reduction is to be applied. If the test of conditional 162 is affirmative (true), then a wavelet decomposition routine is executed to reduce the vector dimension in operation 164, that can be of a dyadic type. In one form, a Haar wavelet approach is utilized as previously described. In other forms, a different wavelet type and/or dimension reduction technique can be alternatively or additionally utilized. Operation 164 can include options/selections regarding the degree of dimension reduction desired and/or can be arranged to dynamically assign the reduction level. From operation 164, conditional 166 is reached. Likewise, conditional 166 is reached if the test of conditional 162 is negative (false).

Conditional 166 tests whether a vector sampling technique is to be utilized in generating a stratified overview visualization. If the outcome of the test of conditional 166 is affirmative (true), operation 168 is performed. In operation 168, the data vectors are regularly sampled and/or sampled in accordance with a selected distribution. Operation 168 can include options/selections regarding the type of sampling and/or degree of sampling to be performed. Such sampling operation parameters can be assigned by an operator, automatically assigned, and/or may be static or dynamic in nature.

From operation 168, routine 160 continues with operation 170. Likewise, operation 170 is reached directly from conditional 166 when the outcome of conditional 166 is negative (false). Operation 170 returns a reduced data set representative of the overview visualization which can be visually presented with one or more of output devices 26, and/or computationally compared through similarity analysis in process 120.

Returning to FIG. 2, from routine 160, conditional 172 is reached. Conditional 172 tests if process 120 is to continue. If not, process 120 ends, otherwise, operation 174 is reached which continues receiving the data stream and formats it, if needed, as further described in connection with operation 126. From operation 174, process 120 returns to conditional 128 to once again test if the data receive (influx) rate is less than the processing rate of system 20. In one variation, a further conditional (not shown) may be included between operation 174 and conditional 128 that tests if a predetermined length of time or predefined number of system operations have occurred in which case, process 120 returns to operation 130 to automatically generate the baseline visualization instead of conditional 128.

Indeed, many other embodiments and variations are envisioned. For example, different levels of receive rates could be used to trigger different stratification actions. In a further example, one or more of the described types of stratification are not utilized and/or a different stratification strategy is additionally or alternatively utilized instead of one or more of those included in process 120. It should further be understood that in alternative embodiments one or more of the image adjustments of process 120 could be performed with computer equipment 21 before presenting the visualization. Furthermore, stages of process 120 can be iteratively performed in response to changing a selection of one or more parameters by an operator via input device(s) 24. As such selections are made, different visualization results can be presented for comparison on display 26a and/or printer 26b of output device(s) 26. In one form, a Graphic User Interface (GUI) is provided that permits selection among a number of different visualization parameters throughout performance of process 120, such as visualization data size, coloration, resolution, etc. Further, filtering parameters and/or filter type selection (if any) can be presented as a user option and/or automatically/dynamically implemented.

GUI selection can be input by an operator with one or more of devices 24. GUI techniques can also be used to facilitate storage and presentation of visualizations in one or more forms. Indeed, it should be understood that in other embodiments, various operations, routines, and conditionals of process 120 can be combined, performed in a different order, omitted, and/or added to other processes as would occur to those skilled in the art.

Alternatively or additionally, different visualizations can be provided in different windows on display 26a that can be separately scaled, opened, or closed. Optionally, a zoom-in/zoom-out tool can be provided to rescale a visualization and/or portion of a visualization based on operator input with one or more of devices 24, and/or otherwise perform different imaging operations. In one embodiment, coloration enhancement is targeted through operator selection of specified area(s) of a visualization. In another embodiment, different image element patterns and/or appearances are used in different visualization areas. According to other embodiments of the present invention, only a portion of a computer visualization dataset may be displayed at one time and/or a may be displayed on multiple pages or windows.

Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected.

What is claimed is:

1. A method, comprising:
receiving a data stream;
processing a group of data vectors corresponding to the data stream;
generating a reduced data set in response to an increase in a rate of receipt of the data stream above a threshold, said generating including reducing dimension of the data vectors with wavelet decomposition; and
with a computer, generating a visualization with the reduced data set corresponding to at least a portion of the data stream.

2. The method of claim 1, which includes visualizing a part of the data stream in accordance with a multidimensional scaling routine if the rate of receipt of the data stream is below the threshold.

3. The method of claim 1, wherein said visualization comprises a scatter plot, wherein points in the scatter plot represent individual ones of said vectors, and wherein the distance between points in the scatter plot indicates a level of similarity between information in the corresponding data vectors.

4. The method of claim 1, wherein the data stream corresponds to at least one of: a multiplicity of text documents and a multiplicity of images.

5. The method of claim 1, wherein said generating includes performing the wavelet decomposition with Haar wavelets.

6. A method, comprising:
receiving a data stream;
processing a stream of data vectors corresponding to the data stream;
with a computer, generating a first visualization of at least a portion of the data stream by executing a multidimensional scaling routine with at least a corresponding portion of the data vectors;
performing at least one of vector sampling and vector dimension reduction on a group of the data vectors in response to an increase in a rate of receipt of the data stream above a first threshold to provide a data set with a reduced number of data elements relative to the group of the data vectors; and
generating a second visualization with the data set by executing the multidimensional scaling routine with the data elements.

7. The method of claim 6, wherein the dimension reduction routine includes wavelet decomposition.

8. The method of claim 6, wherein the data stream includes at least one of: a multiplicity of text documents and a multiplicity of images.

9. The method of claim 6, which includes generating a third visualization of at least a portion of the data stream by executing a multidimensional scaling routine with at least a corresponding portion of the data vectors if a predetermined length of time has passed since said generating said first visualization.

10. The method of claim 6, wherein said first and second visualizations comprise a scatter plot, wherein points in the scatterplot represent individual ones of said data vectors, and wherein the distance between points in the scatter plot indicates a level of similarity between information in the corresponding data vectors.

11. An apparatus, comprising:
means for receiving a data stream;
means for processing a group of data vectors corresponding to the data stream;
means for generating a reduced data set in response to an increase in a rate of receipt of the data stream above threshold, said generating including reducing dimension of the data vectors in accordance with a wavelet decomposition routine; and
means for providing a visualization as a function of the reduced data set.

12. The apparatus of claim 11, wherein the means for providing includes means for visualizing a part of the data stream in accordance with a multidimensional scaling routine.

13. The apparatus of claim 11, further comprising wherein said visualization comprises a scatter plot, wherein points in the scatter plots represent individual ones of said data vectors, and wherein the distance between points in the scatter plot indicates a level of similarity between information in the corresponding data vectors.

14. The apparatus of claim 11, wherein the data stream corresponds to at least one of: a multiplicity of text documents and a multiplicity of images.

15. The apparatus of claim 11, wherein the means for generating includes performing the wavelet decomposition with Haar wavelets.

* * * * *